UNITED STATES PATENT OFFICE.

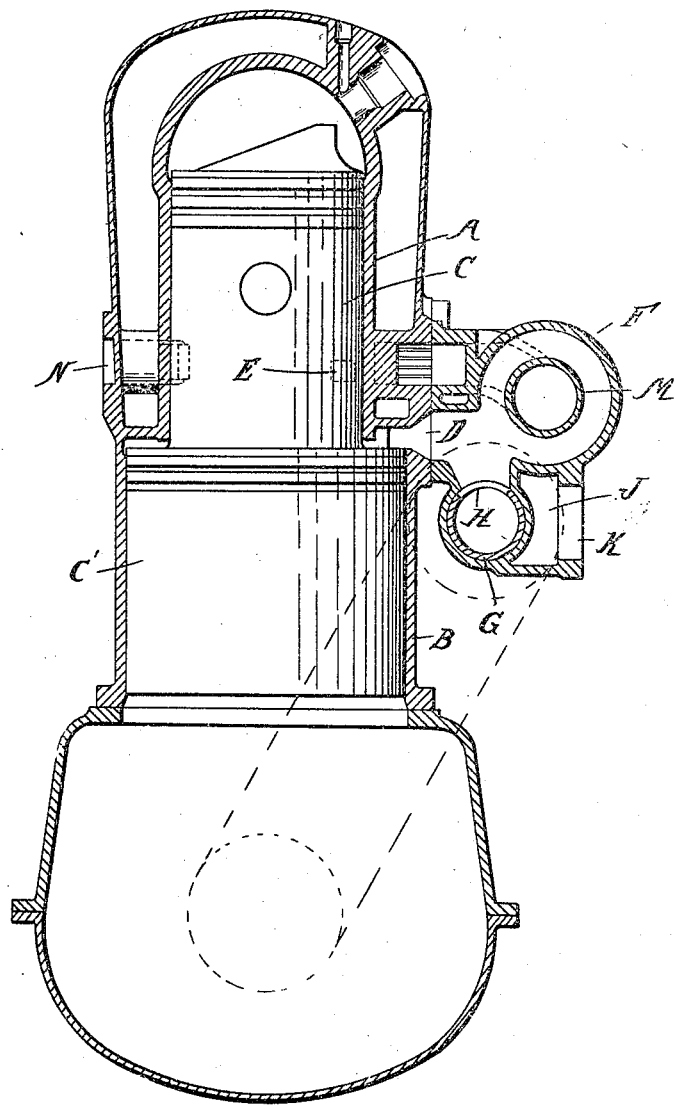

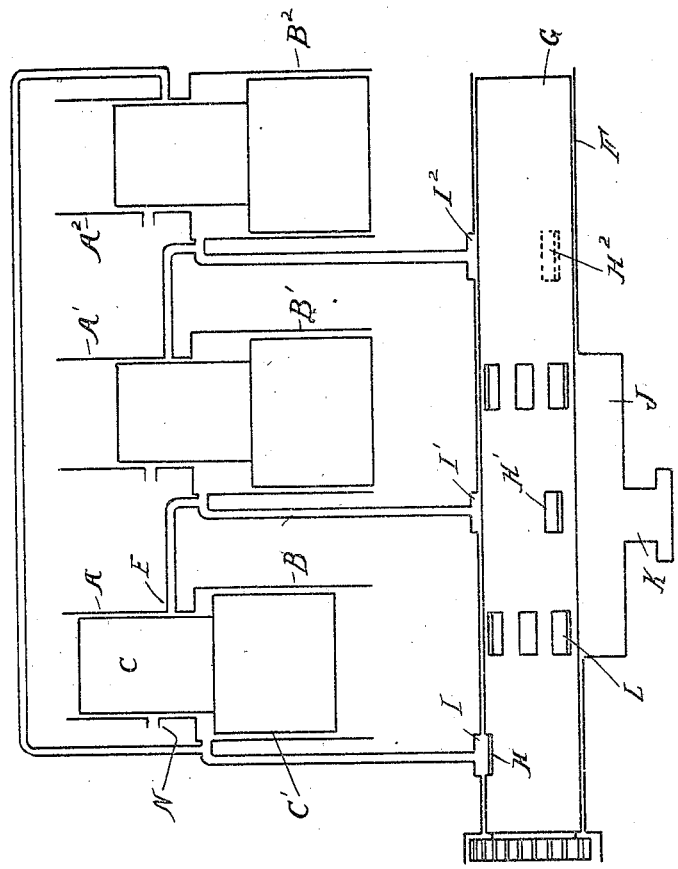

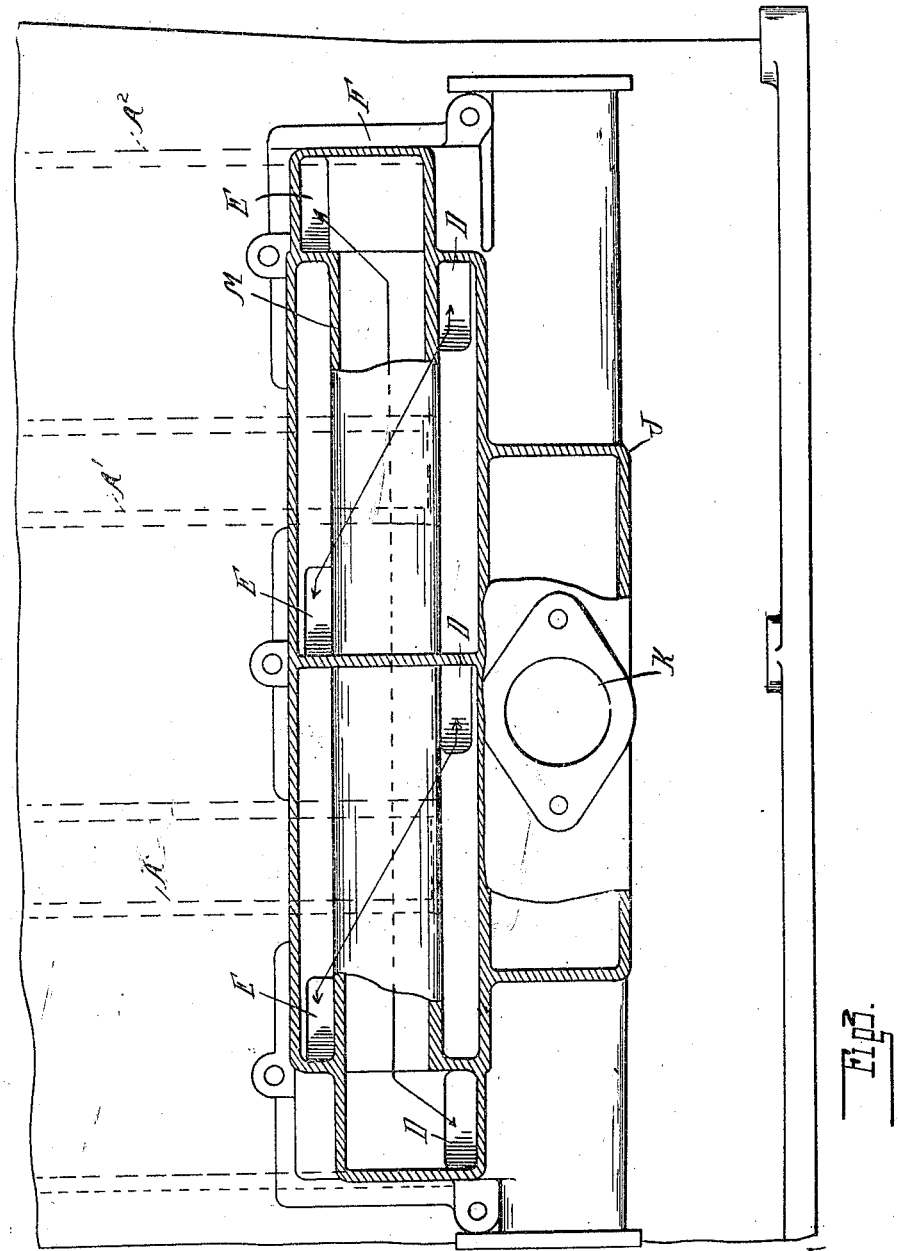

ERNEST R. FRIED, OF DETROIT, MICHIGAN, ASSIGNOR TO GENERAL MOTORS COMPANY, OF DETROIT, MICHIGAN, A CORPORATION OF NEW JERSEY.

MULTICYLINDER TWO-CYCLE ENGINE.

1,138,742.  Specification of Letters Patent.  Patented May 11, 1915.

Application filed March 19, 1912. Serial No. 684,783.

*To all whom it may concern:*

Be it known that I, ERNEST R. FRIED, a subject of the Emperor of Austria-Hungary, residing at Detroit, in the county of Wayne and State of Michigan, have invented certain new and useful Improvements in Multicylinder Two-Cycle Engines, of which the following is a specification, reference being had therein to the accompanying drawings.

The invention relates to multi-cylinder two-cycle engines and more particularly to that type in which each of the cylinders is provided with a corresponding pump for compressing the charge subsequently transferred to the cylinder, said pumps being controlled by a rotary valve. Heretofore in engines of this type the rotary valve has been placed intermediate the pumps and their cylinders and in operation this valve controls both the admission of the explosive charge to each pump and also the transfer to the proper cylinder. With the present invention the structure is simplified by connecting the pumps and their corresponding cylinders through valveless passages, the valve being used solely for controlling the admission of the gases to the several pumps.

A further feature of the invention is the employment of a hollow rotary valve which constitutes a manifold for the uniform distribution of the gas to the several ports for the pumps, and further in the formation of the connecting passages between the pumps and cylinders in the valve casing.

In the drawings, Figure 1 is a vertical cross section through an engine embodying the invention; Fig. 2 is a diagrammatic longitudinal section thereof; and Fig. 3 is a fragmentary side elevation of the engine, partly in section.

A, A' and A² are the power cylinders of a multi-cylinder two-cycle explosion engine and B, B', B² are the pump cylinders formed by enlargements of the lower portion of each power cylinder.

C is the piston having a portion operating in the power cylinder and an enlarged portion C' operating in the pump cylinder, D are ports communicating with the pump cylinders, and E are ports communicating with the power cylinders at a point slightly above the lowest position of the piston.

The valve for controlling the admission of the gaseous charge to each pump and also the connecting conduits between the pumps and their corresponding cylinders are preferably located in the detachable casing F. In the lower portion of this casing is a hollow rotary valve G which extends longitudinally or parallel with the crank shaft and is provided with ports H, H', H² coöperating with ports I, I' and I² in the casing which are connected with the inlet ports D for the several pump cylinders. The explosive charge is admitted through the hollow valve which constitutes a distributing manifold, and to produce a uniform distribution the points of admission to the valve are preferably arranged between the ports for the several pump cylinders. Thus as shown J is a passage formed in the casing F having a central opening K for connection with the carbureter or gas supply conduit and extending in opposite directions from this point.

L are constantly open ports distributed around the valve G which establish communication between the passage J and the interior of the valve, these ports L being between the ports H, H' and H', H².

For connecting the pump cylinders with the engine cylinders to produce the desired sequence in operation, longitudinally extending conduits are necessary. In the preferred arrangement where the angles between the cranks are 120°, the port D of the pump B is connected with the cylinder port E of the cylinder A², the port D of the pump B' is connected with the port E of the cylinder A and the port D of the pump B² is connected with the port E of the cylinder A'. This necessitates crossing conduits which are conveniently formed in the casing F by providing a central conduit M extending between the pump B at one end of the engine to the cylinder A² at the opposite end of the engine, and independent passages for connecting the other pairs of pumps and cylinders surrounding the conduit M. This arrangement economizes space and also avoids the unsightly appearance of crossing pipes outside of the engine casing.

With the construction as described in operation, the ports H, H' and H² will be successively registered with their coöperating ports I, I' and I² to admit the explosive charge in sequence to the pumps B, B' and B². The completion of the downward stroke of the pump piston the inlet port will be closed by the rotation of the valve G and the compression of the charge effected by the upward movement of the pump piston will force the same into the valveless conduit leading to the corresponding engine cylinder. Inasmuch however, as the piston in the cylinder will be in a position closing the inlet port E the compressed charge will not be transferred until the piston passes below said port having previously uncovered the exhaust port N.

It will be observed that the sequence of operations above described will follow with every construction of multi-cylinder engine where there are an uneven number of cylinders or where the factor of three occurs, for with such constructions the movement of the pump piston will be out of unison with that of the corresponding cylinder piston. It is however, unnecessary to provide any valve other than the piston itself for controlling the transfer of the compressed charge from the pump and the cylinder, which both simplifies the construction and reduces the friction in the transfer passage.

What I claim as my invention is:

1. In a multi-cylinder explosion engine, the combination with a plurality of power cylinders having an alined pump cylinder for each power cylinder, of valveless conduits connecting each pump cylinder with an unalined power cylinder, a rotary valve for controlling the admission of the gaseous charges to the respective pump cylinders, and a casing for said valve integral with said connecting conduits for the pump and power cylinders.

2. In a multi-cylinder explosion engine, the combination with a plurality of power cylinders each having an alined pump cylinder, of a rotary valve controlling the admission of the charges successively to said pump cylinders, a casing for said valve, and conduits formed in said casing for connecting each pump cylinder uninterruptedly with an unalined power cylinder.

3. In a multi-cylinder explosion engine, the combination with a plurality of power cylinders each having an alined pump cylinder, of a hollow rotary valve controlling communication between the interior thereof and said pump cylinders successively, and a valve casing having a gas inlet passage communicating with the interior of said hollow valve at a point intermediate the pump cylinder ports, said casing having also formed therein, uninterrupted valveless connecting conduits between each of the pump cylinders, and an unalined power cylinder.

4. In a multi-cylinder explosion engine, the combination with a plurality of power cylinders cast en bloc and alined pump cylinders, of a hollow rotary valve for controlling the successive admission of gaseous charges to the pump cylinders, and a casing for said valve detachably connected to said cylinders having formed therein a gas inlet passage communicating with the interior of said hollow valve, and a plurality of uninterrupted valveless passages, one for connecting each pump cylinder with an unalined power cylinder, said passages being distinct and unconnected with each other.

5. In a multi-cylinder explosion engine, the combination with a plurality of power cylinders each having an alined pump cylinder, of a valve controlling the admission of the charges successively to said pump cylinders, a casing for said valve provided with a conduit extending between a pump cylinder and an unalined power cylinder, and independent passages for connecting the other pairs of unalined pump and power cylinders, said passages surrounding said conduit.

6. In a multi-cylinder explosion engine, the combination with a plurality of power cylinders each having an alined pump cylinder, of a rotary valve member controlling the admission of the charges successively to said pump cylinders, a casing member for said valve, and a plurality of conduits within one of said members for connecting each pump cylinder uninterruptedly with an unalined power cylinder.

In testimony whereof I affix my signature in presence of two witnesses.

ERNEST R. FRIED.

Witnesses:
JAMES WHITTEMORE,
ADELAIDE I. ADAMS.